(12) United States Patent
Biswas et al.

(10) Patent No.: US 12,348,404 B2
(45) Date of Patent: Jul. 1, 2025

(54) METHODS, SYSTEMS AND COMPUTER READABLE MEDIA FOR EMULATING PHYSICAL LAYER IMPAIRMENTS IN A CLOUD COMPUTING ENVIRONMENT

(71) Applicant: Keysight Technologies, Inc., Santa Rosa, CA (US)

(72) Inventors: Manomugdha Biswas, Kolkata (IN); Kingshuk Mandal, Kolkata (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 352 days.

(21) Appl. No.: 18/098,573

(22) Filed: Jan. 18, 2023

(65) Prior Publication Data
US 2024/0179085 A1 May 30, 2024

Related U.S. Application Data

(60) Provisional application No. 63/428,562, filed on Nov. 29, 2022.

(51) Int. Cl.
*H04L 43/55* (2022.01)

(52) U.S. Cl.
CPC .................... *H04L 43/55* (2022.05)

(58) Field of Classification Search
CPC ..................................... H04L 43/55
USPC ........................................... 370/252
See application file for complete search history.

(56) References Cited

U.S. PATENT DOCUMENTS

| 5,751,963 A | 5/1998 | Umetsu |
| 6,917,595 B2 | 7/2005 | Chang et al. |
| 7,356,679 B1 | 4/2008 | Le et al. |
| 7,890,723 B2 | 2/2011 | LaPedis et al. |

(Continued)

FOREIGN PATENT DOCUMENTS

| EP | 4307115 A1 * | 1/2024 | ......... G06F 9/44526 |
| WO | 2021015802 A1 | 1/2021 | |

OTHER PUBLICATIONS

Lidfeldt, A., & Isaksson, D. (2021). Dynamic bandwidth control for improving 5G network resource utilization in Cloud Radio Access Networks. LU-CS-EX. (Year: 2021).*

(Continued)

*Primary Examiner* — Melvin H Pollack

(57) ABSTRACT

A method for emulating physical layer impairments in a cloud computing environment includes at a test controller: configuring, using a first DI-CNI message comprising first configuration information, a first container hosting a first application, wherein the first configuration information includes information for implementing or emulating a first physical layer related impairment; configuring, using the first DI-CNI message or a second DI-CNI message comprising second configuration information, a second container hosting a second application, wherein the second configuration information includes information for implementing or emulating a second physical layer related impairment; initiating a test session causing test packets to interact with the first container and/or the second container, wherein the test packets are impaired by the first and/or the second physical layer related impairment; and during the test session, sending a third DI-CNI message for modifying the first and/or the second physical layer related impairment.

20 Claims, 7 Drawing Sheets

(56) References Cited

U.S. PATENT DOCUMENTS

| | | | |
|---|---|---|---|
| 7,979,225 | B2 | 7/2011 | Muller et al. |
| 8,387,048 | B1 | 2/2013 | Grechishkin et al. |
| 8,706,879 | B2 | 4/2014 | Sparks |
| 8,942,109 | B2 | 1/2015 | Dorenbosch et al. |
| 9,042,245 | B2 | 5/2015 | Tzannes et al. |
| 9,065,770 | B2 | 6/2015 | Chew et al. |
| 9,614,689 | B2 | 4/2017 | Cook et al. |
| 9,628,339 | B1 | 4/2017 | Thai et al. |
| 9,785,527 | B2* | 10/2017 | Regev .................. G06F 11/261 |
| 9,971,620 | B2 | 5/2018 | Karnes |
| 10,102,020 | B2 | 10/2018 | Cornea et al. |
| 10,880,019 | B1 | 12/2020 | Mestre Adrover et al. |
| 11,388,081 | B1 | 7/2022 | Sommers et al. |
| 11,388,228 | B2 | 7/2022 | Giassa et al. |
| 11,496,360 | B1 | 11/2022 | Krzos |
| 11,743,182 | B2* | 8/2023 | Sharma ............... H04L 41/0803 709/238 |
| 11,765,080 | B2* | 9/2023 | Brar ..................... H04L 61/103 709/224 |
| 11,775,655 | B2* | 10/2023 | Malvankar ............ G06N 3/045 726/25 |
| 11,789,850 | B2* | 10/2023 | Mohamed El Amine .................. G06F 11/3698 717/135 |
| 11,853,197 | B2* | 12/2023 | Leasck .................. G06F 11/302 |
| 11,895,020 | B1* | 2/2024 | Arham ................... H04L 45/42 |
| 11,902,318 | B2* | 2/2024 | Rivera ............... H04L 63/1441 |
| 11,924,031 | B2* | 3/2024 | Smith ..................... H04L 41/20 |
| 11,991,077 | B2* | 5/2024 | Mariappan ............ H04L 41/046 |
| 11,991,097 | B2* | 5/2024 | Nallamothu ........... H04L 45/38 |
| 12,050,525 | B2* | 7/2024 | Hadas ...................... G06F 30/20 |
| 12,069,039 | B2* | 8/2024 | Sharma ............... G06F 9/44505 |
| 12,099,624 | B2* | 9/2024 | Palod ...................... G06F 21/53 |
| 12,118,380 | B2* | 10/2024 | Huo ..................... H04L 67/561 |
| 12,160,450 | B2* | 12/2024 | Kaimal .................. H04L 63/20 |
| 12,184,450 | B2* | 12/2024 | Shen .................. H04L 61/2535 |
| 12,210,890 | B2 | 1/2025 | Liu et al. |
| 12,218,908 | B2* | 2/2025 | Thubert .............. H04L 12/4641 |
| 12,229,574 | B2* | 2/2025 | Sinha .................. G06F 9/45558 |
| 2014/0149983 | A1 | 5/2014 | Bonilla et al. |
| 2014/0281304 | A1 | 9/2014 | Hoffman |
| 2014/0298335 | A1 | 10/2014 | Regev et al. |
| 2015/0156203 | A1 | 6/2015 | Giura et al. |
| 2016/0110212 | A1* | 4/2016 | Karnes .................... H04L 45/14 718/1 |
| 2016/0203016 | A1 | 7/2016 | Cornea et al. |
| 2018/0089206 | A1 | 3/2018 | Tamura et al. |
| 2019/0042320 | A1 | 2/2019 | Prince et al. |
| 2019/0149410 | A1 | 5/2019 | Araujo et al. |
| 2019/0155613 | A1 | 5/2019 | Olderdissen et al. |
| 2020/0366588 | A1 | 11/2020 | Bergeron |
| 2022/0253324 | A1 | 8/2022 | Liu et al. |
| 2024/0028357 | A1* | 1/2024 | Lan ....................... G06F 9/5077 |
| 2024/0031267 | A1* | 1/2024 | Gu ........................ H04L 41/044 |
| 2024/0143365 | A1* | 5/2024 | Nguyen .............. G06F 9/45545 |
| 2024/0163184 | A1* | 5/2024 | Vishnoi ................ H04L 43/028 |
| 2024/0406076 | A1* | 12/2024 | Wang ...................... H04L 41/40 |

OTHER PUBLICATIONS

Leppälä, M. (2021). I/O Performance of Secure Container Runtime in Far Edge Cloud (Master's thesis). (Year: 2021).*

I. Pelle, F. Paolucci, B. Sonkoly and F. Cugini, "Latency-Sensitive Edge/Cloud Serverless Dynamic Deployment Over Telemetry-Based Packet-Optical Network," in IEEE Journal on Selected Areas in Communications, vol. 39, No. 9, pp. 2849-2863, Sep. 2021. (Year: 2021).*

A. Dutta and O. Gnawali, "Large-scale network protocol emulation on commodity cloud, " 2014 IEEE Global Communications Conference, Austin, TX, USA, 2014, pp. 1114-1119. (Year: 2014).*

G. Nardini, G. Stea, A. Virdis, D. Sabella and P. Thakkar, "Using Simu5G as a Realtime Network Emulator to Test MEC Apps in an End-To-End 5G Testbed," 2020 IEEE 31st Annual International Symposium on Personal, Indoor and Mobile Radio Communications, London, UK, 2020, pp. 1-7. (Year: 2020).*

B. Martini, M. Gharbaoui, D. Adami, P. Castoldi and S. Giordano, "Experimenting SDN and Cloud Orchestration in Virtualized Testing Facilities: Performance Results and Comparison," in IEEE Transactions on Network and Service Management, vol. 16, No. 3, pp. 965-979, Sep. 2019. (Year: 2019).*

Notice of Allowance for U.S. Appl. No. 17/171,716 (Sep. 29, 2024).

Fiandrino, et al., "openLEON: An End-to-End Emulation Platform from the Edge Data Center to the Mobile User", Sep. 7, 2019. Computer Communications 148, Elsevier B.V. (Year: 2019).

Benet, et al., "OpenStackEmu—A Cloud TestBed Combining Network Emulation with OpenStack and SDN", 2017, 14th IEEE Annual Consumer Communications & Networking Conference (CCNC), IEEE. (Year: 2017).

Cao, et al., "TurboNet: Faithfully Emulating Networks with Programmable Switches", IEEE. (Year: 2020).

Non-Final Office Action for U.S. Appl. No. 17/171,716 (Mar. 14, 2024).

Notice of Allowance and Fee(s) Due for U.S. Appl. No. 17/217,920 (Mar. 4, 2022).

"TekExpress USB 3.0 (USB-RMT) Automated Receiver Compliance and Margin Test Solutions," Tektronix, pp. 1-154 (2021).

"QSFP DD Loopback Modules," High Speed IO, Amphenol ICC, pp. 1-2 (2021).

Sultana et al., "Flightplan Dataplane Disaggregation and Placement for P4 Programs," 18th {USENIX} Symposium on Networked Systems Design and Implementation, pp. 1-22 (2021).

"Network Emulator II—Ethernet 10GE, 1GE, and 100MbE Ethernet Impairment Emulation," Keysight Technologies, pp. 1-8 (Oct. 22, 2020).

"INE Network Emulator Appliance," Technical Specifications, pp. 1-2 (2018).

"The Value of Network Impairment Testing in Power Grids," Calnex SNE, pp. 1-2 (2006).

Spirent Communications, "Cloud Computing Testing," pp. 1-10 (Apr. 2010).

Notice of Allowance for U.S. Appl. No. 16/671,005 (Feb. 28, 2022).

Final Office Action for U.S. Appl. No. 16/671,005 (Sep. 17, 2021).

Search Report under Section 17(5) for Great Britain Application Serial No. GB2015752.5 (Apr. 13, 2021).

Commonly-Assigned, co-pending U.S. Appl. No. 16/671,005 for "Methods, Systems and Computer Readable Media for Self-Replicating Cluster Appliances," (Unpublished, filed Oct. 31, 2019).

"Auto-Scalable Network Visibility System," The IP.com Journal, vol. 19, No. 9B, pp. 1-11 (Sep. 2019).

"What are microservices?" Red Hat Inc., Wayback Machine, https://opensource.com/resources/what-are-microservices, pp. 1-7 (Accessed Aug. 11, 2019).

"Self-Healing Network Visibility System," The IP.com Journal, vol. 19, No. 7A, pp. 1-5 (Jul. 2019).

"What is Docker?," Red Hat Inc., https://opensource.com/resources/what-docker, pp. 1-5 (2019).

"Modernize your applications, accelerate innovation," Enterprise Container Platform: Docker, https://www.docker.com/, pp. 1-5 (2019).

"Concepts: What is Kubernetes," Kubernetes, https://kubernetes.io/docs/concepts/overview/what-is-kubernetes/, pp. 1-7 (Oct. 9, 2019).

"Production-Grade Container Orchestration," Kubernetes, https://kubernetes.io/, pp. 1-8 (2019).

"LaTex—A document preparation system," The LaTex Project, https://www.latex-project.org, pp. 1-2 (Oct. 15, 2019).

"Concepts: Taints and Tolerations," Kubernetes, https://kubernetes.io/docs/concepts/configuration/taint-and-toleration/, pp. 1-11 (Sep. 27, 2019).

"Git VCS," Software Freedom Conservancy, https://git-scm.com, pp. 1-3 (Aug. 16, 2019).

"Tutorials: Viewing Pods and Nodes," Kubernetes, https://kubernetes.io/docs/tutorials/kubernetes-basics/explore/explore-intro/, pp. 1-3 (Apr. 25, 2019).

Kvapil, "Building a Network Bootable Server Farm for Kubernetes with LTSP," Kubernetes, https://kubernetes.io/blog/2018/10/02/building-a-network-bootable-server-farm-for-kubernetes-with-ltsp/, pp. 1-10 (Oct. 2, 2018).

(56) References Cited

OTHER PUBLICATIONS

Notice of Allowance and Fee(s) Due for U.S. Appl. No. 14/598,188 (Jun. 14, 2018).
Applicant-Initiated Interview Summary for U.S. Appl. No. 14/598,188 (May 22, 2018).
"Principles of Chaos Engineering," https://principlesofchaos.org/?lang=ENcontent, pp. 1-3 (May 2018).
Advisory Action for U.S. Appl. No. 14/598,188 (Apr. 10, 2018).
Final Office Action for U.S. Appl. No. 14/598,188 (Jan. 2, 2018).
Non-Final Office Action for U.S. Appl. No. 14/598,188 (Jun. 22, 2017).
Final Office Action for U.S. Appl. No. 14/598,188 (Jan. 9, 2017).
Non-Final Office Action for U.S. Appl. No. 14/598,188 (Jul. 8, 2016).
"IX Chariot—Solution Brief," Ixia, 915-3034-01 Rev. D, pp. 1-2, www.ixiacom.com (Feb. 2014).
"IxVM," Ixia, web.archive.org/web/20130902225026/ http://www.ixiacom.com/products/network_test/applications/ixvm/?print=1 (Sep. 2, 2013).
"GNU General Public License," Free Software Foundation, vol. 2, https://www.gnu.org/licenses/old-licenses/gpl-2.0.en.html, pp. 1-6 (Jun. 1991).

* cited by examiner

METHODS, SYSTEMS AND COMPUTER READABLE MEDIA FOR EMULATING PHYSICAL LAYER IMPAIRMENTS IN A CLOUD COMPUTING ENVIRONMENT

PRIORITY CLAIM

This application claims the priority benefit of U.S. Provisional Patent Application Ser. No. 63/428,562, filed Nov. 29, 2022, the disclosure of which is incorporated herein by reference in its entirety.

TECHNICAL FIELD

The subject matter described herein relates to network testing involving cloud computing environments. More particularly, the subject matter described herein relates to methods, systems, and computer readable media for emulating physical layer impairments in a cloud computing environment.

BACKGROUND

Containers, also referred to as virtual containers, application containers, or software containers, are units of software that packages or contains applications or code (e.g., for performing services or other functionality) along with configurations and code dependencies used to run the applications or code. Containers may share an operating system (OS) installed on a physical or virtual machine but each container may run resource-isolated processes. A popular type of containers are Docker containers.

Container or cluster orchestration software, such as Kubernetes, can be used to send containers out to different nodes (e.g., a physical or virtual machine or a computing platform for running one or more containers), manage clusters (e.g., one or more nodes, usually a master node and one or more worker nodes) and/or pods (e.g., one or more containers that can share workload, a local network, and resources), and to start up additional containers as demand increases. For example, Kubernetes can be used to configure a Kubernetes service that defines a logical set of pods running somewhere in a cluster (e.g., across multiple nodes), and that all provide the same functionality. In this example, the Kubernetes service may be assigned a unique IP address (also referred to as a clusterIP). This IP address can be tied to the lifespan of the Kubernetes service, e.g., the IP address may not change while the Kubernetes service is alive. Pods can be configured to talk to a Kubernetes service front-end, and communication to the Kubernetes service can be automatically load-balanced by the service front-end to a pod member of the Kubernetes service.

While containers, clusters, and related orchestration software can be useful for setting up or configuring elastic architectures (e.g., cloud computing environments) for testing purposes, issues can arise when setting up these architectures to have or emulate realistic physical layer or layer 1 characteristics.

SUMMARY

The subject matter described herein includes methods, systems, and computer readable media for emulating physical layer impairments in a cloud computing environment. A method for emulating physical layer impairments in a cloud computing environment includes at a test controller for configuring a plurality of entities in a cloud computing environment using a dynamic impairment container network interface (DI-CNI) capable of instructing one or more of the plurality of entities to implement or emulate one or more physical layer related impairments: configuring, using a first DI-CNI message comprising first configuration information, a first container hosting a first application, wherein the first configuration information includes information for implementing or emulating a first physical layer related impairment for impairing traffic to or from the first container; configuring, using the first DI-CNI message or a second DI-CNI message comprising second configuration information, a second container hosting a second application, wherein the second configuration information includes information for implementing or emulating a second physical layer related impairment for impairing traffic to or from the second container; initiating a test session causing test packets to interact with the first container and/or the second container, wherein the test packets are impaired by the first physical layer related impairment and/or the second physical layer related impairment; and during the test session, sending a third DI-CNI message comprising third configuration information for modifying the first physical layer related impairment and/or the second physical layer related impairment.

A system for emulating physical layer impairments in a cloud computing environment includes at least one processor, a memory and a test controller using the at least one processor and the memory. The test controller is configured for configuring a plurality of entities in a cloud computing environment using a DI-CNI capable of instructing one or more of the plurality of entities to implement or emulate one or more physical layer related impairments. The test controller is further configured for: configuring, using a first DI-CNI message comprising first configuration information, a first container hosting a first application, wherein the first configuration information includes information for implementing or emulating a first physical layer related impairment for impairing traffic to or from the first container; configuring, using the first DI-CNI message or a second DI-CNI message comprising second configuration information, a second container hosting a second application, wherein the second configuration information includes information for implementing or emulating a second physical layer related impairment for impairing traffic to or from the second container; initiating a test session causing test packets to interact with the first container and/or the second container, wherein the test packets are impaired by the first physical layer related impairment and/or the second physical layer related impairment; and during the test session, sending a third DI-CNI message comprising third configuration information for modifying the first physical layer related impairment and/or the second physical layer related impairment.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "node" refers to a physical node (e.g., a computing platform including one or more processors and memory) or a virtual node (e.g., a virtual machine (VM) running on a computing platform including one or more processors and memory).

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

Figure 1:
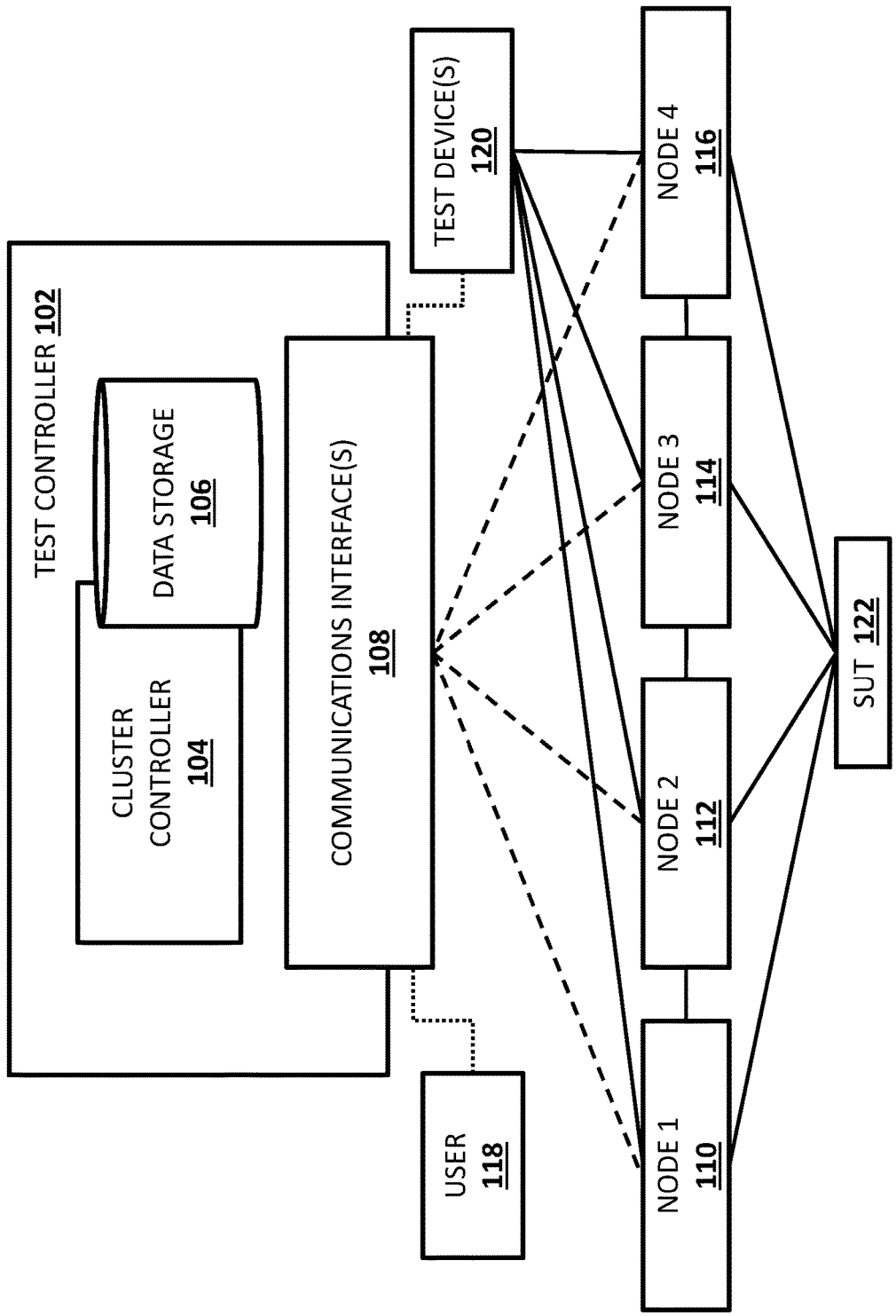
FIG. 1 is a block diagram illustrating an example test controller for configuring a plurality of entities in a cloud computing environment.

The subject matter described herein includes methods, systems, and computer readable media for emulating physical layer impairments in a cloud computing environment. When testing network devices or aspects of networks, a test operator may need to emulate a cloud computing environment, e.g., a large scale or hyperscale environment. One way to emulate such a network is to use virtualization or related concepts, e.g., containers and related orchestration software, like Kubernetes. While Kubernetes based networks or similar environments can allow for efficient creation of an emulated large scale network comprising multiple containers, such environments do not easily provide mechanisms to emulate realistic physical layer or layer characteristics for test purposes. For example, while Kubernetes based networks or similar environments may provide a container network interface (CNI) framework for connecting containers across a cluster of nodes and handing over packet delivery to a host OS or other node-based routing mechanisms, such frameworks generally do not allow a user to control or emulate physical layer characteristics of the connections created.

In accordance with some aspects of the subject matter described herein, techniques, methods, or mechanisms are disclosed for emulating physical layer impairments in a cloud computing environment. For example, a test controller or a related entity therein in accordance with aspects described herein may utilize a new type of CNI, referred to herein as dynamic impairment CNI (DI-CNI), capable of connecting containers across a cluster of nodes as well as emulating physical layer or network layer one characteristics associated with connections between containers or related pods. In this example, the test controller may utilize DI-CNI for instructing or causing a section of an emulated network to have different maximum transmission unit (MTU) sizes (including Jumbo Frame), different links having different delay characteristics, different network sections to have different drop characteristics, and/or some network sections to experience packet corruptions or other impairments. Continuing with this example, these characteristics may be constant or can vary, e.g., follow a pattern as configured by a test operator or user.

Advantageously, in accordance with some aspects of the subject matter described herein, DI-CNI allows a user or test operator to emulate realistic physical layer behaviors (e.g., dynamic and/or static impairments) in a cloud computing environment (e.g., an elastic, cluster based test environment). Moreover, DI-CNI instructions or the physical layer effects thereof can be transparent (e.g., unknown) to containers or applications thereof in a cloud computing environment. Hence, the containers and applications in the cloud computing environment do not need to be modified to implement or emulate physical layer or network layer one characteristics or impairments using DI-CNI.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example test controller for configuring a plurality of entities or related entities in a cloud computing environment 100. Referring to FIG. 1, environment 100 may include a test controller 102, nodes 110-116, and a user 118. In some embodiments, environment 100 may represent or include a Kubernetes based cluster environment or a container orchestration software related environment. In some embodiments, test controller 102 or aspects thereof may be distinct from or co-located in environment 100 or nodes therein.

Test controller 102 may represent any suitable entity or entities (e.g., one or more computing platforms or a device implemented using at least one processor) for performing one or more aspects associated with testing SUT 122 and/or various aspects thereof. In some embodiments, test controller 102 may be implemented using one or more processors and/or memory.

In some embodiments, test controller 102 may include functionality for configuring a test environment, such as cloud computing environment 100 including, for example, nodes 110-116 and test device(s) 120. For example, test controller 102 may configure test device(s) 120 comprising traffic generators. In this example, the traffic generator may receive configuration information regarding test traffic and may utilize one or more processors (e.g., executing software stored in memory) to generate traffic patterns or scenarios for various message streams (e.g., flows or sessions). In another example, test controller 102 may send commands or instructions to test device(s) 120 for performing or initiate various tests and/or analyses involving test packets and/or related responses from a system under test (SUT) 122. In this example, test controller 102 may send instructions to various modules or entities (e.g., test device(s) 120) for controlling (e.g., to pause, (re)start, or stop) a test session. In another example, test controller 102 may include functionality for sending configuration information (e.g., to nodes 110-116 or entities thereof) usable for configuring containers and/or related entities (e.g., pods, nodes, etc.) for hosting or supporting one or more services, functions, or applications (e.g., control plane applications, user plane applications, or other applications).

In some embodiments, test controller 102 may include functionality for supporting or utilizing container network interface (CNI), e.g., a framework for dynamically configuring networking resources in cloud computing environment 100 (e.g., a cluster of pods or containers). In some embodiments, CNI may utilize a group of libraries and specifications for configuring a cluster based network, provisioning IP addresses, and maintaining connectivity with multiple pods, containers, or related hosts. In such embodiments, various entities in cloud computing environment 100 may include a CNI plug-in or related software for receiving CNI messages or related instructions and for performing various CNI related actions, e.g., setting up interfaces for communications between pods or containers.

In some embodiments, test controller 102 may include functionality for configuring containers or other entities using a dynamic impairment container network interface (DI-CNI). In such embodiments, DI-CNI may provide the same or similar functionality as CNI with additional functionality for emulating or implementing dynamic or static physical layer or layer 1 impairments. For example, test controller 102 or a related entity may utilize a DI-CNI for instructing one or more entities (e.g., one or more nodes 110-116, Kubernetes nodes, a cluster node, etc.) to implement or emulate one or more physical layer related impairments. In this example, a DI-CNI message may be sent from test controller 102 to a Kubernetes node or module therein (e.g., a DI capable CNI plugin) that instructs the node to emulate a physical layer related impairment.

Example physical layer related impairments may include causing a delay, jitter, packet drop, packet corruption, packet deduplication, a type of packet distribution, a uniform packet distribution, a normal packet distribution, a pareto packet distribution, a paretonormal packet distribution, packet reordering, a packet rate, a change in a maximum transmission unit (MTU) size for packets, or a change of one or more network settings or network segment settings affecting physical layer characteristic(s).

In some embodiments, test controller 102 may act as a master node (e.g., a Kubernetes master node) for controlling a cluster of nodes (e.g., nodes 110-116) and for configuring one or more nodes (e.g., nodes 110-116) or entities implemented therein, e.g., pods, containers, etc. For example, each of nodes 110-116 may represent a Kubernetes node comprising or hosting at least one pod for one or more containers. In this example, test controller 102 or a related entity may include functionality for detecting a new worker node, authorizing the new worker node, and providing a configuration or boot image and/or other data to the new worker node such that the new worker node can join a cluster used in testing.

In some embodiments, test controller 102 may include cluster controller 104, data storage 106, and one or more communications interface(s) 108. Cluster controller 104 may represent any suitable entity or entities (e.g., software executing on at least one processor) for controlling a plurality or cluster of nodes or aspects therein. In some embodiments, cluster controller 104 may also include functionality for detecting a new worker node, authorizing the new worker node, and providing a configuration or boot image and/or other data to the new worker node such that the new worker node can join a cluster (e.g., nodes 110-116).

In some embodiments, cluster controller 104 may utilize container or cluster orchestration software, such as Kubernetes, for providing containers (e.g., containerized applications) to one or more of nodes 110-116 and/or for configuring pods (e.g., groups of related containers with similar or same functionality) and services (e.g., microservices) that utilize the containers and pods.

Data storage 106 may represent any suitable entity (e.g., a computer readable medium, a database, a storage device, or memory) for storing configuration or boot images (e.g., operating system (OS) or kernel images), containers (e.g., containerized applications, various software and/or applications, cluster configuration information, authentication information, active services, pod related information, cluster related resource utilization information, and/or other data. For example, data storage 106 may store one or more repository containing different OS images or related software (e.g., various versions of a client-side cluster configuration agent to install on nodes 110-116).

Communications interface(s) 108 may represent any suitable entities (e.g., network interface cards (NICs), port modules, and/or other hardware or software) for receiving and sending communications via various communications protocols and/or data formats. For example, communications interface(s) 108 may include a configuration and monitoring interface for communicating with nodes 110-116. In another example, communications interface(s) 108 may include a user interface (UI), a graphical UI (GUI), and/or an application programming interface (API) for allowing user 118 or another entity to interact with test controller 102, e.g., for configuring a test session or a test environment (e.g., cloud computing environment 100 or entities therein).

User 118 may be any entity (e.g., an automated system or a device or system controlled or controllable by a human user) for selecting, viewing, and/or configuring various aspects associated with test controller 102 or cloud computing environment 100. For example, user 118 may provide configuration information to test controller 102 via communications interface(s) 108. Example UIs for interacting with test controller 102 or elements in cloud computing environment 100 may support automation (e.g., via one or more scripting languages), a representation state transfer (REST) API, a command line, and/or a web based GUI.

Each of nodes 110-116 may represent any suitable entity (e.g., one or more computing platforms or a device implemented using at least one processor) for performing various aspects associated with performing network testing and/or visibility related tasks or functions. For example, each of nodes 110-116 may include hardware (e.g., a network testing and/or visibility platform or a related device) from Keysight of Santa Clara, California. In this example, each of nodes 110-116 may execute an OS and/or other software provided by test controller 102 or cluster controller 104, e.g., after being communicatively coupled to test controller 102. Continuing with this example, the provided OS and/or other software may allow each of nodes 110-116 to act as a cluster appliance and/or provide cluster-based services and/or functions.

In some embodiments, user 118 may access test controller 102 and view a comprehensive resource map associated with cloud computing environment 100 or related node(s) therein. For example, user 118 may reserve resources for various cluster related services or features. In this example, resource reservation information may be maintained by test controller 102 and/or stored at data storage 106 and such information may be accessible or visible to some or all cluster-based entities and/or users.

SUT 122 may be any suitable entity or entities (e.g., devices, systems, or platforms or software executing on one or more processors) for receiving, processing, forwarding, and/or sending one or more messages (e.g., packets). In some embodiments, SUT 122 may include one or more logical or physical partitions. For example, SUT 122 may include a network node, a network switch, a network router, a network interface card, a packet forwarding device, or a software based element. In some embodiments, SUT 122 or an element thereof may include processing logic (e.g., rules associated with packet forwarding/processing) that is independent or separate from another portion of SUT 122.

In some embodiments, SUT 122 may be a container or software in a virtual container (VC) or a virtual machine (VM) executing on shared resources (e.g., compute, storage, and network resources) in cloud computing environment 100 or entities thereof. For example, SUT 122 may be a container or related application executing on one or more of nodes 110-116.

It will be appreciated that FIG. 1 is for illustrative purposes and that various depicted entities, their locations, and/or their functions described above in relation to FIG. 1 may be changed, altered, added, or removed. It will also be appreciated that while nodes 110-116 are shown in FIG. 1, there could be more or less nodes in cloud computing environment 100 or a cluster therein.

Figure 2:
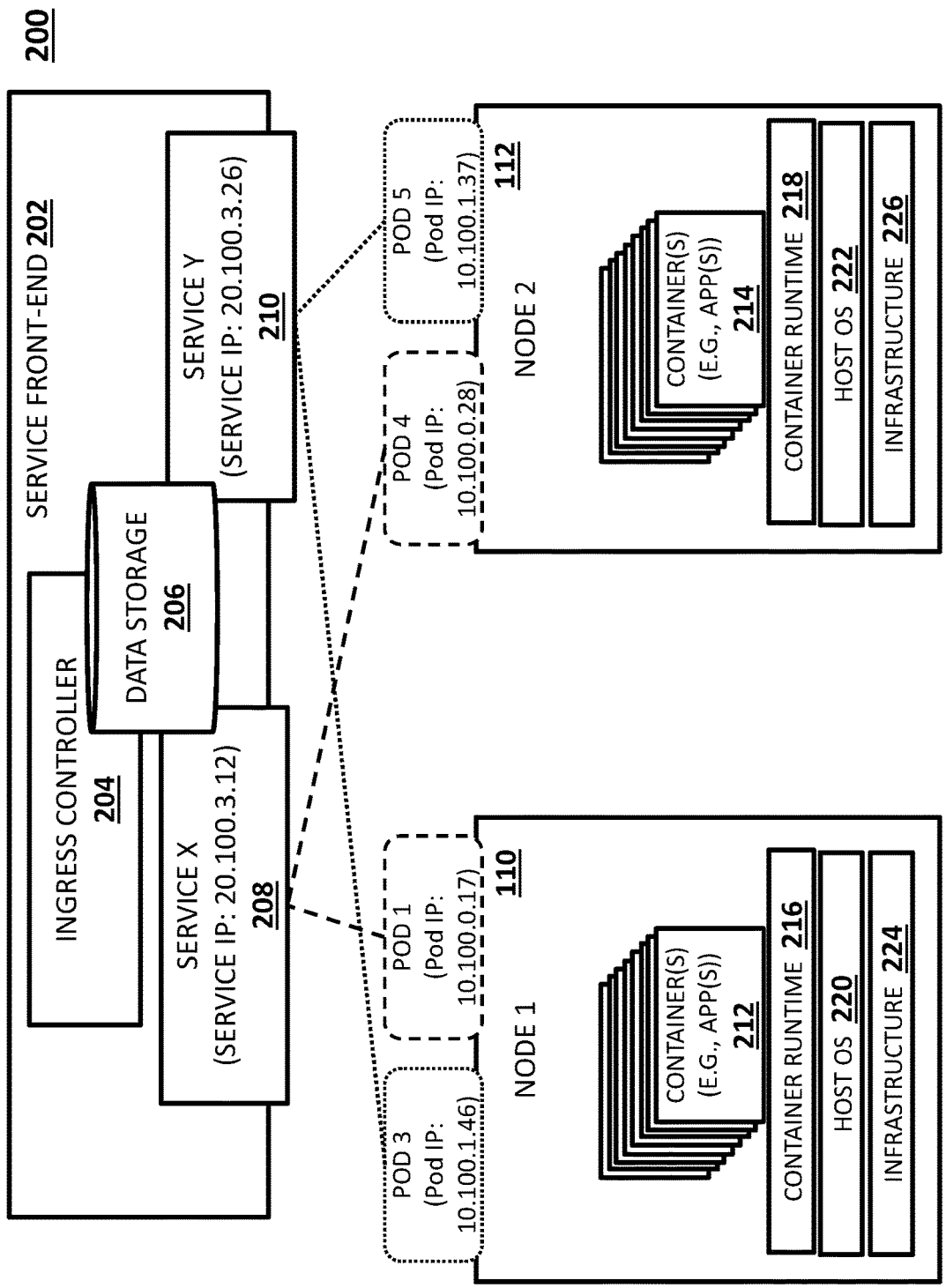
FIG. 2 is a block diagram illustrating an example cluster-based service environment.

FIG. 2 is a block diagram illustrating an example cluster-based service environment 200. Referring to FIG. 2, cluster-based service environment 200 may also include a service front-end (SFE) 202 for interacting with or communicating with a cluster comprising nodes 110-112 and/or related pods and containers.

SFE 202 may represent any suitable entity or entities (e.g., software executing on at least one processor, a field-programmable gate array (FPGA), an application-specific integrated circuit (ASIC), or a combination of software, an ASIC, or an FPGA) for performing one or more aspects associated with receiving service requests and distributing (e.g., load sharing) these service requests to one or more containerized applications associated with one or more pods hosted on nodes 110-112.

In some embodiments, SFE 202 may include or interact with test controller 102 and/or cluster controller 104. For example, SFE 202 may include software executing on a computing device or platform that also includes test controller 102, cluster controller 104, or related functionality. In another example, SFE 202 may be located at a computing device or platform different from a computing device or platform comprising test controller 102 or cluster controller 104, but these entities may communicate using one or more APIs or management messages, e.g., DI-CNI messages.

In some embodiments, various features or functions associated with SFE 202 may be performed by an ingress controller 204. For example, ingress controller 204 may represent any suitable entity or entities (e.g., software executing on at least one processor) for receiving service requests from various sources (e.g., from the internet or another network), where the service requests are for requesting one or more network testing or network visibility related microservices. In this example, ingress controller 204 may distribute service requests to relevant pods based on an internet protocol (IP) data tuple (e.g., source IP, source port, destination IP, destination port, and protocol), a destination IP address (e.g., associated with a service), and/or other information.

Data storage 206 may represent any suitable entity (e.g., a computer readable medium, a database, a storage device, or memory) for storing various data associated with providing one or more cluster related and/or container related service, e.g., microservices. Example data stored in data storage 206 may include service requests, pod configuration data, network address information, cluster related information, load sharing algorithm, and/or other information. In some embodiments, data storage 206 may be used to store state or other information such that related service requests (e.g., requests from a same client) are sent to the same pod for handling. In some embodiments, SFE 202 may be a separate node and/or entity from test controller 102 and may be configured to access or communicate with cluster related resources, e.g., test controller 102, nodes 110-112, containers, pods, etc. In some embodiments, SFE 202 may be test controller 102 or include some similar functionality. For example, SFE 202 may be capable of configuring a worker node for providing a service (e.g., a network testing or visibility microservice) and for emulating one or more physical layer related impairment(s).

In some embodiments, each of nodes 110-112 may be a Kubernetes worker node with one or more pods comprising one or more containers (e.g., containerized applications, Docker containers or other types of containers). For example, a Kubernetes worker node may be controlled and administered via a Kubernetes master node. In this example, a Kubernetes master node and one or more Kubernetes worker nodes may be referred to as a Kubernetes cluster.

In some embodiments, each of nodes 110-112 may include a number of processes and/or software for cluster related communications and/or functions. For example, a Kubernetes worker node may include a Kubelet process usable for sending communications between the Kubernetes master node and the Kubernetes worker node. In this example, the Kubelet process may manage the pods and the containers running on the Kubernetes worker node.

In some embodiments, node 110 may include one or more container(s) 212, a container runtime 216, a host operating system (OS) 220, and related infrastructure 224 and node 112 may include one or more container(s) 214, a container runtime 218, a host OS 222, and related infrastructure 226.

In some embodiments, each of container runtimes 216-218 may represent software (e.g., Docker, rkt) usable for executing or running respective container(s). For example, container runtime 216 may include functionality for obtaining a container image from a container registry (e.g., a Docker registry at test controller 102), unpacking the container, and running the container or a related application. In this example, host OS 220 and related infrastructure 224 (e.g., physical compute and storage resources) may be utilized for executing container runtime 216, container(s) 212, and/or related software.

In FIG. 2, SFE 202 or ingress controller 204 may receive and distribute service requests for one or more different services, e.g., Service 'X' and service 'Y'. For example, each service may represent an abstraction that includes a logical set of pods running somewhere in cloud computing environment 100 (e.g., a cluster including nodes 110-116), where the pods provide the same functionality. When created, each service may be assigned a unique IP address (also called clusterIP). For example, as depicted in FIG. 2, service 'X' may be associated with IP address '20.100.3.12' and service 'Y' may be associated with IP address '20.100.3.26'. A clusterIP address may be tied to its respective service for the service's lifespan and may not change while the service is active.

In some embodiments, SFE 202 or ingress controller 204 may load share or distribute communications sent to a clusterIP address via one or more pods associated with a related service. For example, as depicted in FIG. 2, pods '1' and '4' may be associated with service 'X' and pods '3' and '5' may be associated with service 'Y'. In this example, after selecting a particular pod to handle a service request, SFE 202 or ingress controller 204 may provide the service request to the appropriate pod by sending the service request to the pod using the pod's IP address. For example, as depicted in FIG. 2, pod '1' may be associated with IP address '10.100.0.17' and pod '4' may be associated with IP address '10.100.0.28', while pod '3' may be associated with IP address '10.100.1.46' and pod '5' may be associated with IP address '10.100.1.37'.

In some embodiments, each pod may be associated with a cluster-private IP address. Cluster-private IP addresses may be generally unreachable by nodes outside the cluster (except via SFE 202), but may be used for inter-pod and inter-node communications. In some embodiments, pods associated with a particular service may also be associated with a same subnet or related subnet mask. By utilizing cluster-private IP addresses, containers within a given pod may reach each other's ports via localhost, and all pods in a cluster may see each other without network address translation (NAT), thereby alleviating the need to explicitly create links between pods or to map container ports to host ports.

In contrast to using cluster-private IP address and pod related addressing as described above, some container based solutions may use host-private networking whereby containers can communicate with each other only if they are on the same host or node. For example, with a host-private networking, in order for Docker containers to communicate across nodes, there must be allocated ports on a Docker node's own IP address, which are then forwarded or proxied to the containers. In this example, containers must either coordinate which ports they use very carefully or ports must be allocated dynamically for such internode container communications to work. Since host-private networking requires port mappings to deliver internode communications, it can be very difficult to scale, particularly across developers, and can expose users to cluster-level issues outside of their control.

It will be appreciated that FIG. 2 is for illustrative purposes and that various depicted entities, their locations, and/or their functions described above in relation to FIG. 2 may be changed, altered, added, or removed. It will also be appreciated that while nodes 110 and 112 are shown in FIG. 2, there could be more or less nodes in cluster-based service environment 200.

Figure 3:
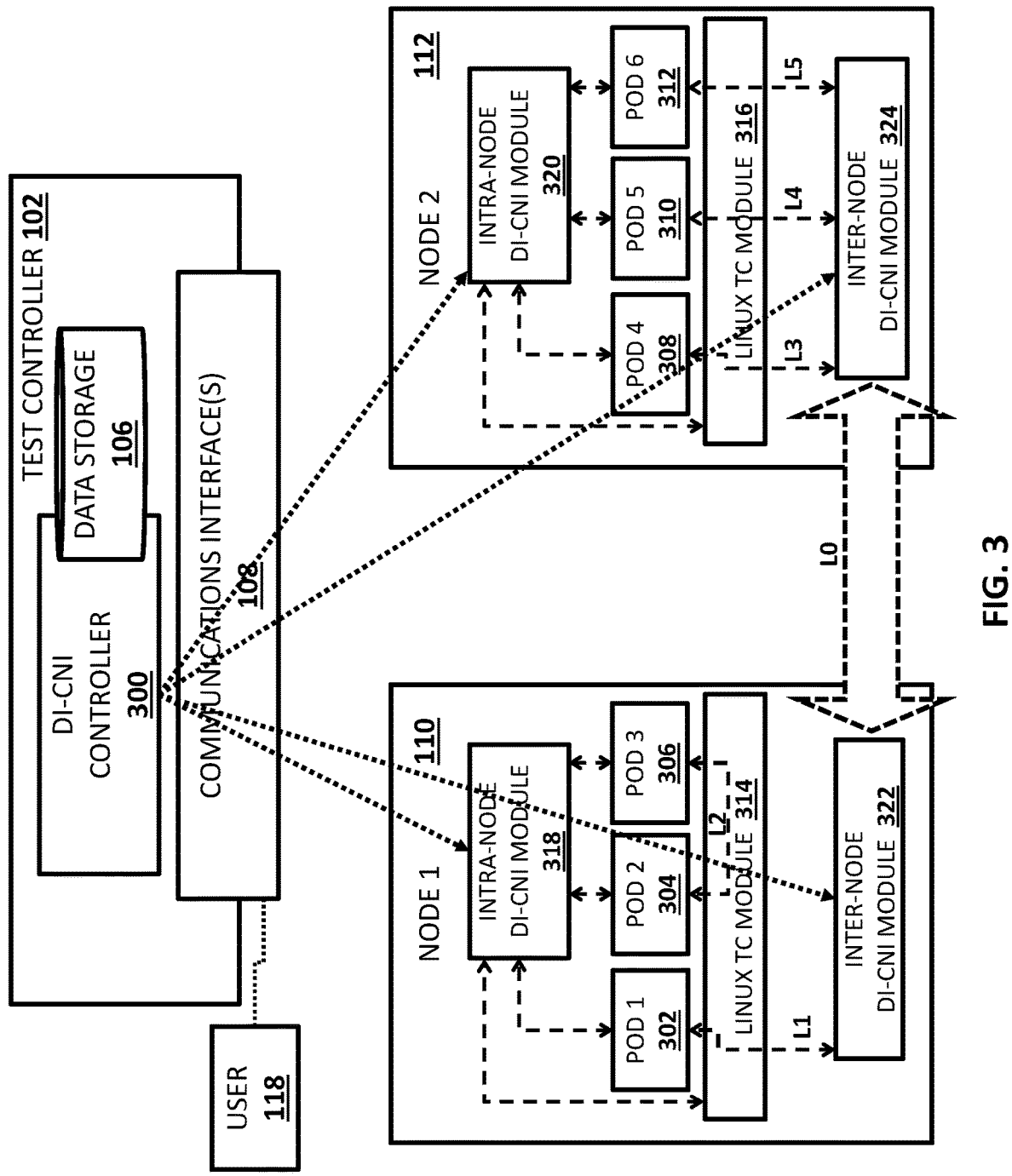
FIG. 3 is a block diagram illustrating an example DI-CNI controller for implementing or emulating physical layer related impairments in a cloud computing environment.

FIG. 3 is a block diagram illustrating an example DI-CNI controller 300 for implementing or emulating physical layer related impairments in cloud computing environment 100. In some embodiments, test controller 102 may include or interact with DI-CNI controller 300. DI-CNI controller 300 may represent any suitable entity or entities (e.g., a node, a device, software executing on at least one processor, etc.) for controlling a cluster of nodes or aspects therein, e.g., creating connections and interfaces between pods or containers and/or emulating physical layer impairments. For example, DI-CNI controller 300 may instruct various entities (e.g., DI-CNI modules 318-324) for implementing or emulating physical layer (e.g., layer 1) related impairments associated with one or more containers or pods (e.g., control plane pods 302-312) running on nodes 110 and 112 in cloud computing environment 100.

In some embodiments, DI-CNI controller 300 may include the same functionality or similar functionality of cluster controller 104 or SFE 202 described above. For example, DI-CNI controller 300 may be configured to setup or configure a cluster comprising nodes 110-112 with pods 302-312. In this example, each of pods 302-312 may include one or more containers (e.g., network control plane containers) that utilize a shared IP address range or subnet. Continuing with this example, DI-CNI controller 300 may interact with nodes 110 and 112 or entities therein for configuring interfaces between containers or pods and/or for emulating physical layer related impairments.

In some embodiments, each of nodes 110-112 may be deployed with one or more DI-CNI components or modules (e.g., software executing on one or more processors or compute resources) for configuring container network interfaces and/or various DI-CNI aspects. For example, node 110 may include an intra-node DI-CNI module 318 and an inter-node DI-CNI module 322 and node 112 may include an intra-node DI-CNI module 320 and an inter-node DI-CNI module 324.

In some embodiments, each of intra-node DI-CNI modules 318-320 may include a Kubernetes CNI plug-in and/or related functionality (e.g., software) for controlling or configuring connections between pods or containers located and executing on a respective node. For example, each of intra-node DI-CNI modules 318-320 may create and/or configure one or more network interface(s) for facilitating communications between pods or containers thereof. In this example, each of intra-node DI-CNI modules 318-320 may utilize Linux netlink or a related mechanism to implement the network interface(s). In another example, each of intra-node DI-CNI modules 318-320 may facilitate communications between pods hosted by the same node by utilizing a Linux virtual ethernet (vEth) pair (e.g., link L2) and may also facilitate various impairments via a Linux traffic control (TC) module 314 or other OS mechanisms.

In some embodiments, each of intra-node DI-CNI modules 318-320 may receive instructions or related information (e.g., an impairment profile or impairment information) from DI-CNI controller 300 and use this information to emulate or implement various impairments for traffic traversing one or more links (e.g., link L2 between pods 304 and 306). For example, intra-node DI-CNI module 318 may interact with host OS 220 or related OS components (e.g., Linux TC module 314) to implement or emulate impairments. In this example, intra-node DI-CNI module 318 may control or leverage Linux TC module 314 to impairment actions like packet drop, packet delay, packet corruption, duplications, etc. Continuing with this example, during a test session, intra-node DI-CNI module 318 may program or re-program Linux TC module 314 to create or emulate various physical layer or layer 1 characteristics for all links (e.g., links L1 and L2) that are under its control. Similarly, in another example, intra-node DI-CNI module 320 may program or re-program Linux TC module 316 to create or emulate various physical layer or layer 1 characteristics for all links (e.g., links L3, L4, and L5) that are under its control.

In some embodiments, each of inter-node DI-CNI modules 322-324 may include a CNI daemon and/or related functionality (e.g., software) for controlling or configuring connections between pods or containers located and executing on different nodes. For example, each of inter-node DI-CNI modules 322-324 may create and/or configure one or more network interface(s) for facilitating communications between pods or containers at different nodes, e.g., communications between pod 302 (e.g., at node 110) and pod 308 (e.g., at node 112). In this example, each of inter-node DI-CNI modules 322-324 may include a daemon or process that runs constantly and that receives traffic destined for a different node or traffic from a different node. Continuing with this example, before sending or after receiving traffic, each of inter-node DI-CNI modules 322-324 or another entity (e.g., an OS component or module programmed by a DI-CNI module) may emulate or implement an impairment before the traffic is sent onward. In another example, each of inter-node DI-CNI modules 322-324 may facilitate communications and related impairments between pods at different nodes by utilizing OS mechanisms or other software. In some embodiments, each of inter-node DI-CNI modules 322-324 or a related entity may generate telemetry or other analysis data related to inter-node traffic or flows.

In some embodiments, each of inter-node DI-CNI modules 322-324 may receive instructions or related information (e.g., an impairment profile or impairment information) from DI-CNI controller 300 and use this information to emulate or implement various impairments for traffic traversing one or more inter-node links (e.g., link L0 between nodes 110 and 112). For example, inter-node DI-CNI module 324 may interact with host OS 222 or related OS components to implement or emulate impairments. In another example, inter-node DI-CNI module 324 may include hardware and/or software for implementing or emulating impairment for inter-node traffic. In some embodiments, each of inter-node DI-CNI modules 322-324 may be configured to impair particular types or a portion of inter-node traffic. For example, e.g., when a delay impairment is emulated for inter-node traffic, egress traffic is impaired at the originating node, e.g., by its respective inter-node DI-CNI module or another entity. In another example, e.g., when a delay impairment is emulated for inter-node traffic, ingress traffic is impaired at the destination node, e.g., by its respective inter-node DI-CNI module or another entity.

In some embodiments, by utilizing DI-CNI modules 318-324 or similar functionality, test controller 102 or DI-CNI controller 300 can utilize DI-CNI or related messages to provide or emulate various physical layer or layer 1 characteristics (e.g., physical layer related impairments) in various network segments or portions of cloud computing environment 100. In such embodiments, test controller 102 or DI-CNI controller 300 can also utilize DI-CNI or related messages to change or modify physical layer or layer 1 characteristics during a test session, e.g., to emulate a realistic scenario or a dynamic scenario. For example, test controller 102 or DI-CNI controller 300 can send an impairment profile or related impairment instructions to DI-CNI modules 318-324 for causing network delay to improve in one network segment while concurrently causing network corruption to increase in a different network segment during a test session.

In some embodiments, physical layer or layer 1 characteristics that can be controlled or affected by test controller 102 or DI-CNI controller 300 include delay, jitter, packet drop, packet corruption, packet deduplication, packet distribution (e.g., uniform, normal, pareto, paretonormal), packet reordering, packet rate, MTU size, etc. For example, test controller 102 or DI-CNI controller 300 can cause some portions or links in cloud computing environment 100 to experience configurable delay, jitter, packet corruptions, or packet drops by programming Linux TC module 314 or other entities to emulate such impairments via local DI-CNI modules 318 and/or 322.

In some embodiments, test controller 102 or DI-CNI controller 300 may utilize predetermined or user-specified network profiles comprising test and/or network configuration settings including instructions or information for emulating dynamic and/or static physical layer related impairments or characteristics. For example, using the dynamic nature of DI-CNI, user 118 or a test operator can instruct test controller 102 or DI-CNI controller 300 to create a "chaos monkey" in a test network during a test session where physical layer or layer 1 characteristics of links can randomly in a highly unpredictable manner over time.

In some embodiments, network or impairment profiles may be based on traffic type, time of day, load/resource requirements, and/or a particular technology or domain. For example, when testing whether a control plane of a video service based network can survive (e.g., appropriately process or handle a predetermine amount or percentage of user traffic) when five percent of network links has high delay and two percent of the network links have some amount of packet corruption, a corresponding DI-CNI video network impairment profile may indicate that a test environment (e.g., pods 302-312) should emulate five percent of network links having high delay (e.g., 0.6 seconds or higher) and emulate two percent of the network links having some amount of packet corruption (e.g., at least three percent of traffic is corrupted on these links). In this example, instead of hard-coding or making the impacted links static, the DI-CNI video network impairment profile may be created to allow for changing or dynamic impairments, e.g., when delay improves in some links of the test network then a few other links in the test network starts experiencing higher delay but the percentage of links always remains at or above five percent.

It will be appreciated that FIG. 3 is for illustrative purposes and that various depicted entities, their locations, and/or their functions described above in relation to FIG. 3 may be changed, altered, added, or removed. It will also be appreciated that while nodes 110 and 112 are shown in FIG. 3, there could be more or less nodes in cloud computing environment 100 or a cluster therein configurable or controllable by DI-CNI controller 300.

Figure 4:
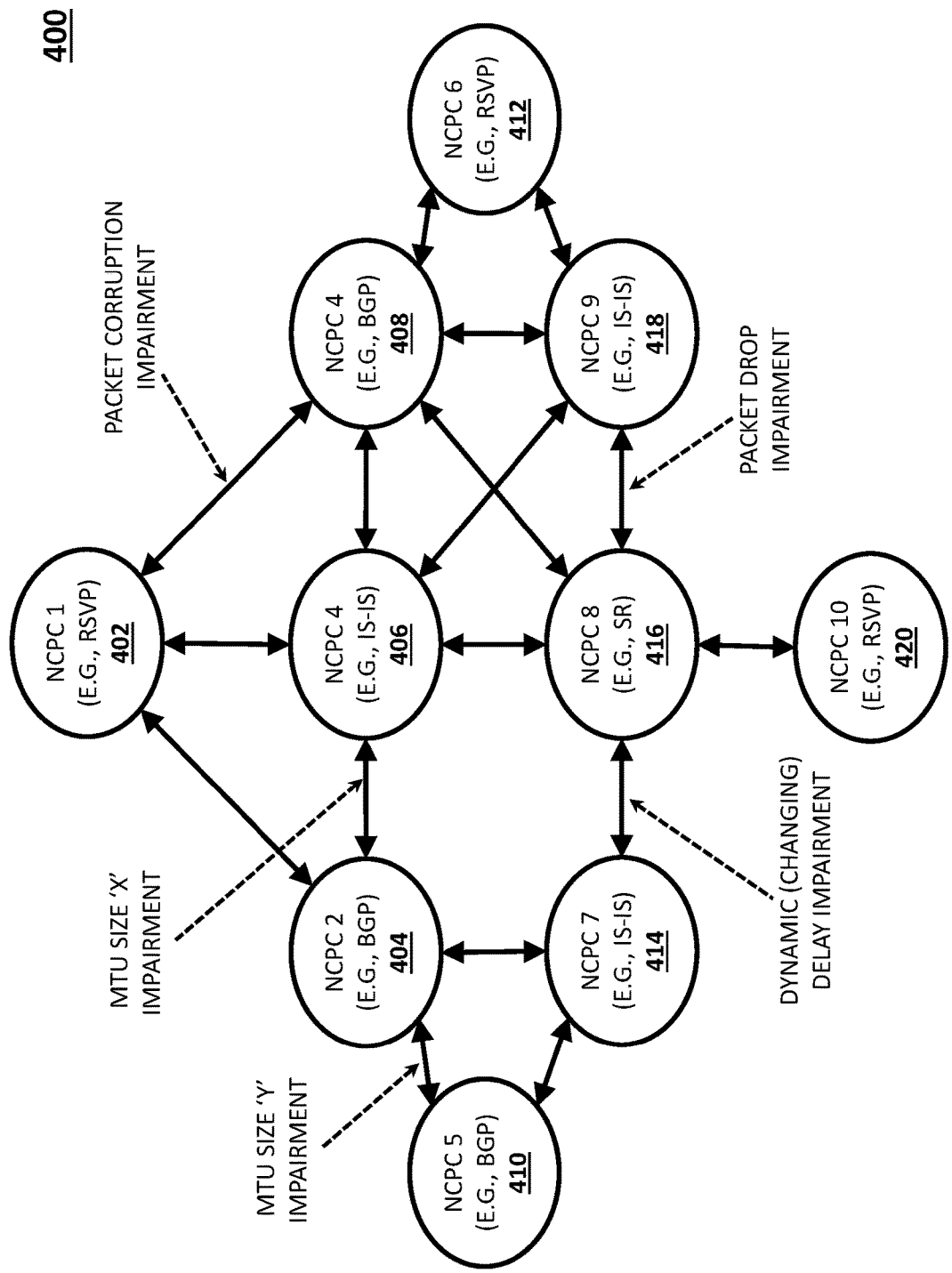
FIG. 4 is a diagram illustrating a container based network with various impairments.

FIG. 4 is a diagram illustrating a container based network 400 with various emulated physical layer impairments. In some embodiments, network 400 may represent a control pane network including network control plane containers (NCPCs) 402-420. Each of NCPCs 402-420 may support or host one or more control plane protocols or related application. For example, as depicted in FIG. 4, NCPCs 402, 412, and 420 may support or host a resource reservation protocol (RSVP); NCPCs 404, 408, and 410 may support or host a border gateway protocol (BGP); NCPCs 406, 414, and 418 may support or host an intermediate system to intermediate system (IS-IS) routing protocol; and NCPC 416 may support or host segment routing (SR).

Referring to FIG. 4, each of NCPCs 402-420 may be connected to one or more of NCPCs 402-420 and may be implemented in cloud computing environment 100 or a cluster therein, e.g., at node 110 or node 112. For example, NCPCs 402-410 may be located within a first pod (e.g., pod 302) of node 110, NCPCs 412-418 may be located within a second pod (e.g., pod 304) of node 110, and NCPC 420 may located in a pod (e.g., pod 310) of node 112.

In some embodiments, test controller 102 or a related entity (e.g., DI-CNI controller 300) may facilitate robustness testing of control plane technologies and may allow an end user (e.g., user 118) to measure a control plane's ability to self-heal network 400 and/or to validate the robustness of the mitigation strategies.

In some embodiments, test controller 102 or a related entity (e.g., DI-CNI controller 300) may instruct nodes 110 and/or 112 or entities therein (e.g., DI-CNI modules 118-124) via DI-CNI messages or other messages when setting up NCPCs 402-420 and/or for emulating physical layer related impairments associated with one or more of NCPCs 402-420. For example, since links between NCPCs 402-420 may be set up and controlled by DI-CNI or related entities, such operations may be transparent or unknown to NCPCs 402-420 and, as such, NCPCs 402-420 may not need any modification to operate in a DI-CNI provided network. Further, by utilizing DI-CNI and related entities, physical layer or layer 1 characteristics of these links between NCPCs 402-420 may be controlled or manipulated, e.g., to emulate impairments during testing.

As depicted in FIG. 4, various physical layer related impairments may be implemented or emulated in network 400. For example, a network element (e.g., node 110 or inter-node DCI controller 322) may emulate an impairment causing heterogeneous MTU sizes (e.g., a link or container may have a MTU size that is less than or greater than another link or container) among different NCPCs or links connecting them. In another example, a network element (e.g., node 110 or intra-node DCI controller 318) may emulate an impairment causing packet drops for some traffic or traffic types (e.g., by leveraging Linux TC or another mechanism) communicated between NCPCs 416 and 418. In another example, a network element (e.g., node 110 or intra-node DCI controller 318) may emulate an impairment causing packet corruption for some traffic or traffic types (e.g., by leveraging Linux TC or another mechanism) communicated between NCPCs 402 and 408. In another example, a network element (e.g., node 110 or intra-node DCI controller 318) may emulate a 'chaos monkey' impairment causing dynamic delays (e.g., packet delay times can vary or change during a test session) for some traffic or traffic types (e.g., by leveraging Linux TC or another mechanism) communicated between NCPCs 414 and 416.

It will be appreciated that FIG. 4 is for illustrative purposes and that various depicted entities, their locations, and/or their functions described above in relation to FIG. 4 may be changed, altered, added, or removed.

Figure 5:
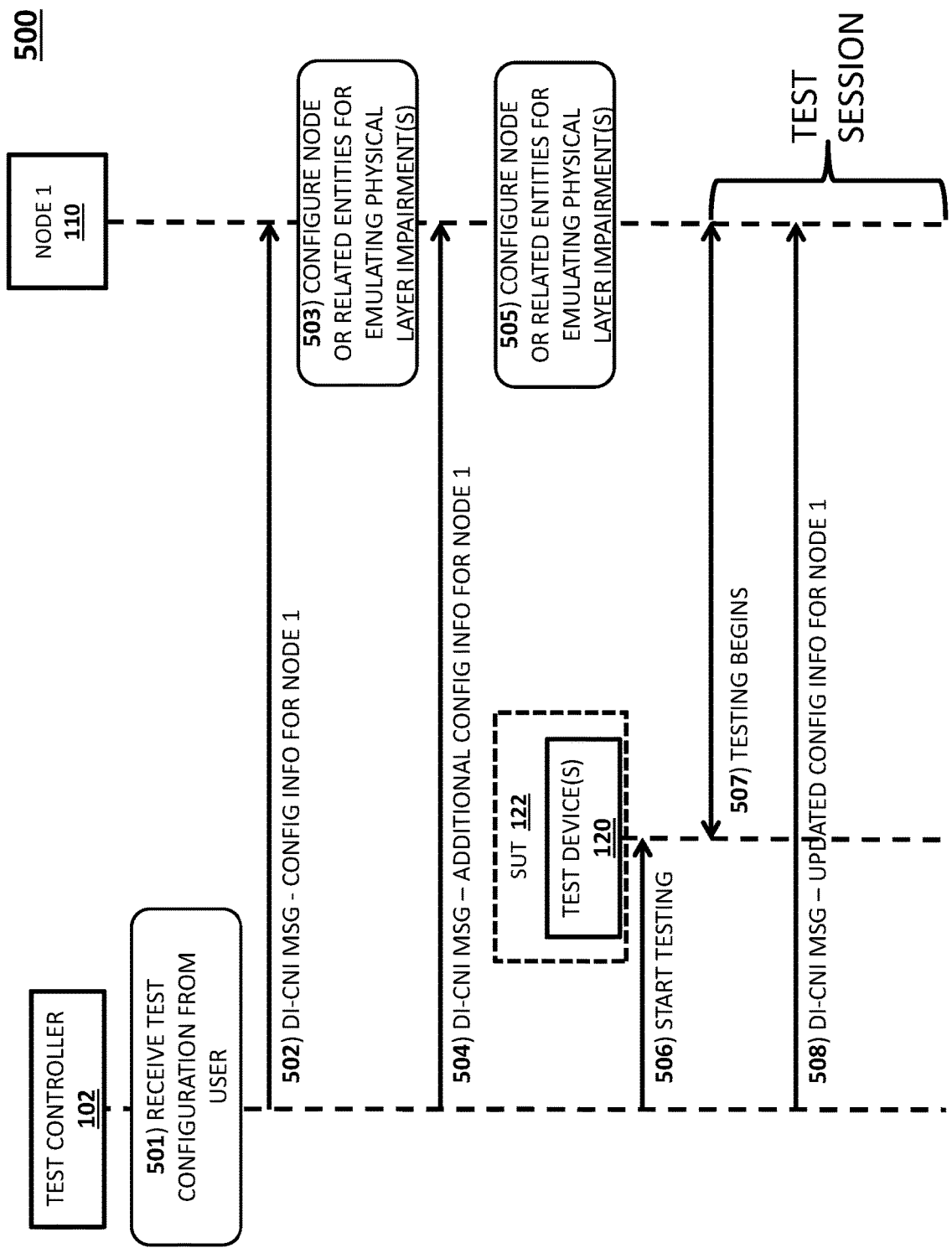
FIG. 5 depicts a message flow diagram illustrating a test controller configuring containers and related impairments.

FIG. 5 depicts a message flow diagram 500 illustrating test controller 102 configuring containers and related impairments. In some embodiments, a test operator (e.g., user 118) may select or provide configuration information for setting up a test environment. For example, user 118 may indicate (e.g., to test controller 102) a number of containers for supporting control plane applications to setup for a test session and one or more impairment profiles defining one or more physical layer related impairments (e.g., for causing packet drops, packet corruptions, dynamic delays, etc.) in the test environment. In this example, test controller 102 may include DI-CNI controller 300 or related functionality for causing node 110 to setup containers and related impairments using a DI-CNI or related technology.

Referring to FIG. 5, in step 501, user 118 may provide or indicate test configuration information including containers to setup and network impairments to be emulated. In some embodiments, test configuration information may be provided via a GUI, an API, or other interface associated with test controller 102.

In step 502, test controller 102 or a related entity (e.g., DI-CNI controller 300) may generate and send to node 110 at least a first configuration or setup message (e.g., one or more DI-CNI messages or other messages) comprising configuration information for setting up a first container (and/or a related pod) at node 110. In some embodiments, a configuration or setup message sent by test controller 102 or DI-CNI controller 300 may include or indicate an image or executable of a control plane related container and an impairment profile for emulating one or more impairments associated with the control plane related container.

In step 503, node 110 may receive configuration information from the at least one configuration or setup message and use the configuration information in setting up the first container, a related pod, or other aspects related to the container. For example, node 110 or related entity thereof (e.g., DI-CNI modules 318 and 322) may utilize configuration information to setup a container in an appropriate pod and to configure the container to interact with various other pods and/or containers via one or more links or interfaces. In this example, DI-CNI modules 318 and 322 may be configured to identify impairments from received impairment information and then implement these impairments by utilizing Linux TC and/or other mechanisms, e.g., Linux TC or another mechanism may emulate packet delay, packet drops, packet corruptions, etc.

In step 504, test controller 102 or a related entity (e.g., DI-CNI controller 300) may generate and send to node 110 at least a second configuration or setup message (e.g., one or more DI-CNI messages or other messages) comprising configuration information for setting up a second container (and/or a related pod) at node 110. In some embodiments, a configuration or setup message sent by test controller 102 or DI-CNI controller 300 may include or indicate an image or executable of a control plane related container and an impairment profile for emulating one or more impairments associated with the control plane related container.

In step 505, node 110 may receive configuration information from the at least one configuration or setup message and use the configuration information in setting up the second container, a related pod, or other aspects related to the container. For example, node 110 or related entity thereof (e.g., DI-CNI modules 318 and 322) may utilize configuration information to setup a container in an appropriate pod and to configure the container to interact with various other pods and/or containers via one or more links or interfaces. In this example, DI-CNI modules 318 and 322 may be configured to identify impairments from received impairment information and then implement these impairments by utilizing Linux TC and/or other mechanisms, e.g., Linux TC or another mechanism may emulate packet delay, packet drops, packet corruptions, etc.

In step 506, test controller 102 or a related entity may send a message for initiating a test session to test device(s) 120. For example, test controller 102 may send a test start message to test device(s) 120 comprising a packet generator for generating and sending test traffic to or via cloud computing environment 100 involving node 110. In this example, test device(s) 120 may be a software agent or device located in SUT 122. In another example, test device(s) 120 may be located external to SUT 122.

In step 507, test device(s) 120 may begin the test session by generating and sending test traffic (e.g., requests and responses) toward containers executing at node 110 and/or other entities of cloud computing environment 100.

In step 508, during the test session, test controller 102 or a related entity (e.g., DI-CNI controller 300) may generate and send at least a third configuration or setup message (e.g., one or more DI-CNI messages or other messages) comprising configuration information for stopping or modifying an existing impairment being emulated at node 110 and/or for creating a new impairment to be emulated at node 110.

It will be appreciated that FIG. 5 is for illustrative purposes and that various depicted messages and details for configuring containers and/or for emulating physical layer related impairments described above in relation to FIG. 5 may be changed, altered, added, or removed.

Figure 6:
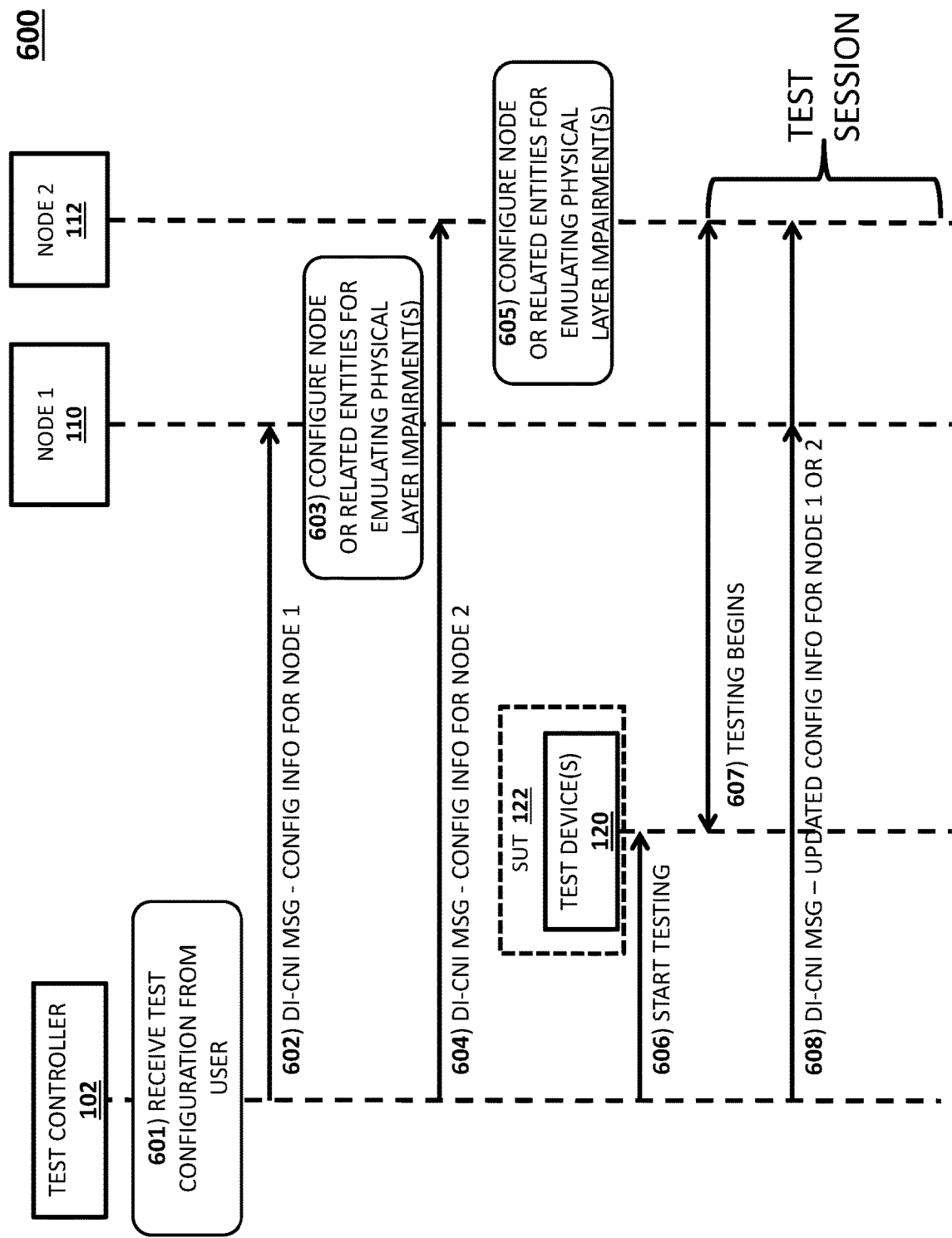
FIG. 6 depicts a message flow diagram illustrating a test controller configuring containers at different nodes and related impairments.

FIG. 6 depicts a message flow diagram 600 illustrating test controller 102 configuring containers at different nodes and related impairments. In some embodiments, a test operator (e.g., user 118) may select or provide configuration information for setting up a test environment. For example, user 118 may indicate (e.g., to test controller 102) a number of containers for supporting control plane applications to setup for a test session and one or more impairment profiles defining one or more physical layer related impairments (e.g., for causing packet drops, packet corruptions, dynamic delays, etc.) in the test environment. In this example, test controller 102 may include DI-CNI controller 300 or related functionality for causing nodes 110 and 112 to setup respective containers and related impairments using a DI-CNI or related technology.

Referring to FIG. 6, in step 601, user 118 may provide or indicate test configuration information including containers to setup and network impairments to be emulated. In some embodiments, test configuration information may be provided via a GUI, an API, or other interface associated with test controller 102.

In step 602, at least a first configuration or setup message (e.g., one or more DI-CNI messages or other messages) comprising configuration information for setting up a first container (and/or a related pod) at node 110 may be sent by test controller 102 (or a related entity) to node 110 (or an entity thereof). In some embodiments, a configuration or setup message sent by test controller 102 or DI-CNI controller 300 may include or indicate an image or executable of a control plane related container (e.g., a container supporting RSVP) and an impairment profile for emulating one or more impairments (e.g., a static or dynamic delay) associated with the control plane related container.

In step 603, node 110 may receive configuration information from the at least one configuration or setup message and use the configuration information in setting up the first container, a related pod, or other aspects related to the container. For example, node 110 or related entity thereof (e.g., DI-CNI modules 318 and 322) may utilize configuration information to setup a container in an appropriate pod and to configure the container to interact with various other pods and/or containers via one or more links or interfaces. In this example, DI-CNI modules 318 and 322 may be configured to identify impairments from received impairment information (e.g., an impairment profile identifier) and then implement these impairments by utilizing Linux TC and/or other mechanisms, e.g., Linux TC or another mechanism may emulate packet delay, packet drops, packet corruptions, etc.

In step 604, at least a second configuration or setup message (e.g., one or more DI-CNI messages or other messages) comprising configuration information for setting up a second container (and/or a related pod) at node 112 may be sent by test controller 102 (or a related entity) to node 112 (or an entity thereof). In some embodiments, a configuration or setup message sent by test controller 102 or DI-CNI controller 300 may include or indicate an image or executable of a control plane related container (e.g., a container supporting BGP) and an impairment profile for emulating one or more impairments associated with the control plane related container.

In step 605, node 112 may receive configuration information from the at least one configuration or setup message and use the configuration information in setting up the second container, a related pod, or other aspects related to the container. For example, node 112 or related entity thereof (e.g., DI-CNI modules 320 and 324) may utilize configuration information to setup a container in an appropriate pod and to configure the container to interact with various other pods and/or containers via one or more links or interfaces. In this example, DI-CNI modules 320 and 324 may be configured to identify impairments from received impairment information (e.g., an impairment profile identifier) and then implement these impairments by utilizing Linux TC and/or other mechanisms, e.g., Linux TC or another mechanism may emulate packet delay, packet drops, packet corruptions, etc.

In step 606, test controller 102 or a related entity may send a message for initiating a test session to test device(s) 120. For example, test controller 102 may send a test start message to test device(s) 120 comprising a packet generator for generating and sending test traffic to or via cloud computing environment 100 involving node 110. In this example, test device(s) 120 may be a software agent or device located in SUT 122. In another example, test device(s) 120 may be located external to SUT 122.

In step 607, test device(s) 120 may begin the test session by generating and sending test traffic (e.g., requests and responses) toward containers executing at node 110 and/or other entities of cloud computing environment 100.

In step 608, during the test session, test controller 102 or a related entity (e.g., DI-CNI controller 300) may generate and send at least a third configuration or setup message (e.g., one or more DI-CNI messages or other messages) comprising configuration information for stopping or modifying an existing impairment being emulated at node 110 or 112 and/or for creating a new impairment to be emulated at node 110 or 112.

It will be appreciated that FIG. 6 is for illustrative purposes and that various depicted messages and details for configuring containers and/or for emulating physical layer related impairments described above in relation to FIG. 6 may be changed, altered, added, or removed.

Figure 7:
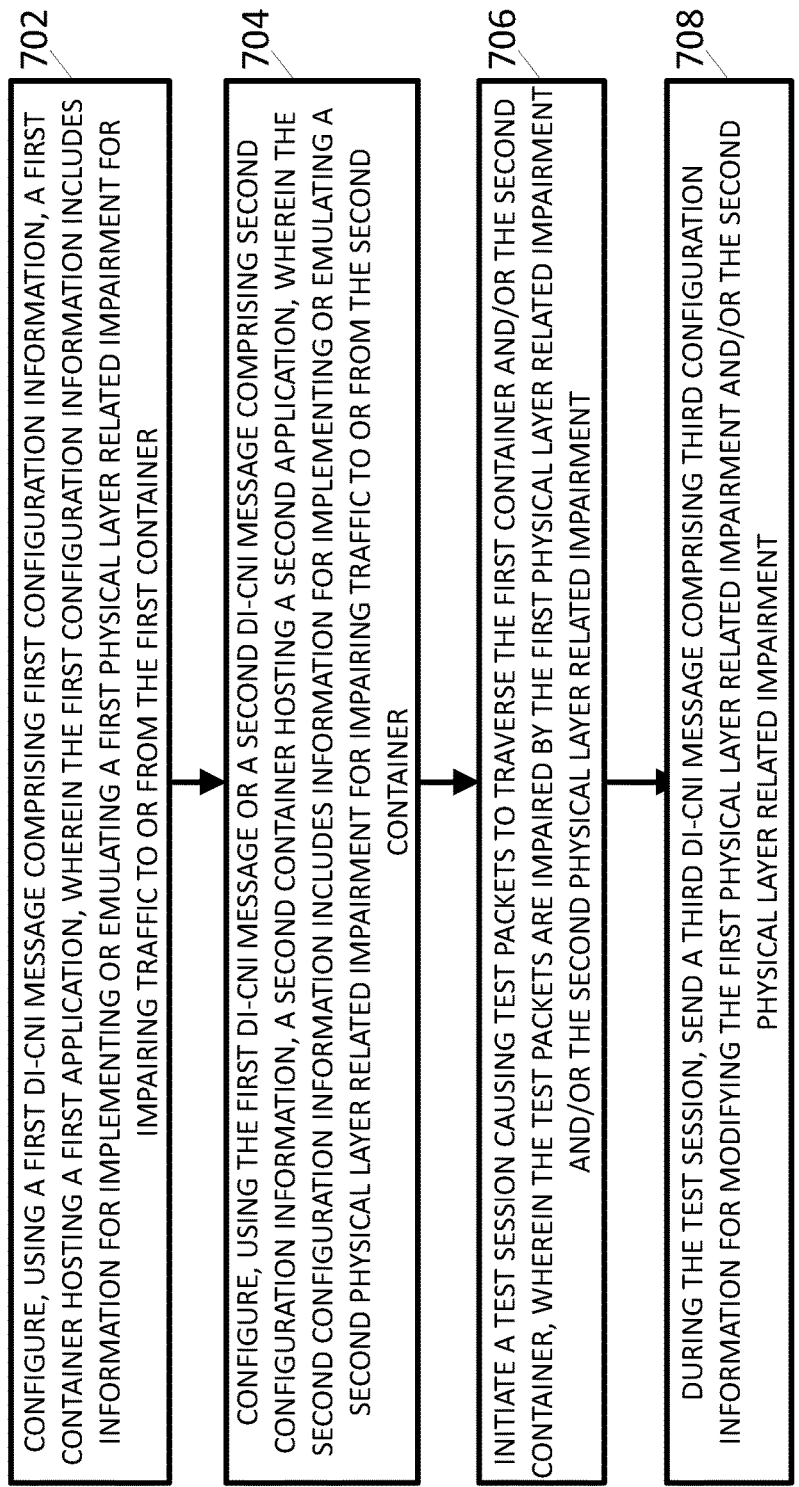
FIG. 7 is a flow chart illustrating an example process for emulating physical layer impairments in a cloud computing environment.

FIG. 7 is a diagram illustrating an example process 700 for emulating physical layer impairments in cloud computing environment 100. In some embodiments, process 700, or portions thereof, may be performed by or at test controller 102, cluster controller 104, DI-CNI controller 300, and/or another node or module. In some embodiments, process 700 may include steps 702, 704, 706, and/or 708.

In some embodiments, process 700 or portions thereof may occur at a test controller for configuring a plurality of entities in cloud computing environment 100 using a DI-CNI capable of instructing one or more of the plurality of entities to implement or emulate one or more physical layer related impairments.

Referring to process 700, in step 702, a first container hosting a first application (e.g., BGP) may be configured using a first DI-CNI message comprising first configuration information. In some embodiments, the first configuration information may include information for implementing or emulating a first physical layer related impairment for impairing traffic to or from the first container.

In step 704, a second container hosting a second application (e.g., an IS-IS routing protocol) may be configured using the first DI-CNI message or a second DI-CNI message comprising second configuration information. In some embodiments, the second configuration information may include information for implementing or emulating a second physical layer related impairment for impairing traffic to or from the second container. For example, test controller or a related entity (e.g., DI-CNI controller 300 or cluster controller 104) may send a message (e.g., a DI-CNI message or a configuration message) that instructs or causes one or more entities (e.g., a node manager, a cluster runtime, intra-node DI-CNI module 318, and/or inter-node DI-CNI module 322) in node 110 to setup one or more containers and related impairment(s). In this example, the message may include configuration information (e.g., impairment data, an impairment profile, or an impairment identifier for indicating one or more impairments or impairment profile) for indicating one or more physical layer related impairments to implement or emulate associated with one or more containers being setup (e.g., impairments that affect traffic to or from a container being configured or setup).

In another example, test controller or a related entity (e.g., DI-CNI controller 300 or cluster controller 104) may send a first message (e.g., a DI-CNI message or a configuration message) that instructs or causes one or more entities (e.g., a node manager, container runtime 216, host OS 220, intra-node DI-CNI module 318, and/or inter-node DI-CNI module 322) in node 110 to setup one or more containers and related impairment(s) and may send a second message (e.g., a DI-CNI message or a configuration message) that instructs or causes one or more entities (e.g., a node manager, container runtime 218, host OS 222, intra-node DI-CNI module 320, and/or inter-node DI-CNI module 324) in node 112 to setup one or more containers and related impairment(s). In this example, each of the messages may include configuration information (e.g., impairment data, an impairment profile, or an impairment identifier for indicating one or more impairments or impairment profile) for indicating one or more physical layer related impairments to implement or emulate for traffic associated with one or more containers being setup (e.g., impairments that affect traffic to or from a container being configured or setup).

In step 706, a test session may be initiated and may cause test packets to interact with the first container and/or the second container, where the test packets are impaired by the first physical layer related impairment and/or the second physical layer related impairment.

In step 708, during the test session, a third DI-CNI message comprising third configuration information may be sent (e.g., to node 110 or node 112 or entities thereof) for modifying the first physical layer related impairment and/or the second physical layer related impairment. For example, test controller or a related entity (e.g., DI-CNI controller 300 or cluster controller 104) may send a message (e.g., a DI-CNI message or a configuration message) during an on-going test session that instructs or causes one or more entities (e.g., a node manager, container runtime 216, host OS 220, intra-node DI-CNI module 318, and/or inter-node DI-CNI module 322) in node 110 to stop or modify impairments that are being emulated.

In some embodiments, configuring a first container (e.g., a container in pod 304) may include configuring an intra-node DI-CNI module (e.g., intra-node DI-CNI module 318) implemented at a first physical or virtual computing node (e.g., node 110) to impair egress packets sent to a second container (e.g., a container in pod 306) or impair ingress packets received from the second container.

In some embodiments, a first container (e.g., a container in pod 304) and a second container (e.g., a container in pod 306) may be located at a first physical or virtual computing node (e.g., node 110).

In some embodiments, a cloud computing environment (e.g., configured with process 700) may comprise a Kubernetes environment.

In some embodiments, a first physical or virtual computing node (e.g., node 110) may include a first Kubernetes node.

In some embodiments, a first container and a second container may be located in different pods (e.g., pods 302 and 304) within a first Kubernetes node (e.g., node 110).

In some embodiments, an intra-node DI-CNI module (e.g., intra-node DI-CNI module 318 or intra-node DI-CNI module 320) may comprise a Kubernetes CNI plug-in.

In some embodiments, configuring a first container (e.g., a container in pod 304) may include configuring an inter-node DI-CNI module (e.g., inter-node DI-CNI module 322) implemented at a first physical or virtual computing node (e.g., node 110) to impair egress packets sent from the first container to a second container (e.g., a container in pod 312) or impair ingress packets received by the first container from the second container.

In some embodiments, a first container may be located at a first physical or virtual computing node (e.g., node 110) and a second container may be located at a second physical or virtual computing node (e.g., node 112).

In some embodiments, a first application or a second application may support a BGP routing protocol, an IS-IS routing protocol, an exterior gateway protocol, an interior gateway protocol, segment routing, or a routing protocol.

In some embodiments, a first physical layer related impairment or a second physical layer related impairment may include causing a delay, jitter, packet drop, packet corruption, packet deduplication, a change in MTU, a type of packet distribution, a uniform packet distribution, a normal packet distribution, a pareto packet distribution, a paretonormal packet distribution, packet reordering, a packet rate, or one or more link related impairments that change locations or extent multiple times.

In some embodiments, a first physical layer related impairment or a second physical layer related impairment may be implemented or emulated using a daemon, a background process, a Linux mechanism, a Linux component, Linux traffic control, Linux netlink, or one or more Linux vEth interfaces.

It will be appreciated that process 700 is for illustrative purposes and that different and/or additional actions may be used. It will also be appreciated that various actions described herein may occur in a different order or sequence.

It should be noted that test controller 102, cluster controller 104, DI-CNI controller 300, and/or functionality described herein may constitute a special purpose computing device. Further, test controller 102, cluster controller 104, DI-CNI controller 300, and/or functionality described herein can improve the technological field of node, pod, and/or cluster configuration. Furthermore, test controller 102, cluster controller 104, DI-CNI controller 300, and/or functionality described herein can improve testing involving cloud computing environments (e.g., a cluster environment like Kubernetes based environment) by utilizing DI-CNI or aspects described herein to emulate realistic physical network behavior in an elastic infrastructure. For example, by utilizing a DI-CNI, a test operator or other entity can effectively configure cloud computing environment 100 to implement or emulate various impairments when setting up containers, pods, or related entities. In this example, some impairments can be dynamic or change over time thereby emulating realistic physical network behavior in an elastic infrastructure, e.g., Kubernetes environment, for testing or other purposes.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for emulating physical layer impairments in a cloud computing environment, the method comprising:
    at a test controller for configuring a plurality of entities in a cloud computing environment using a dynamic impairment container network interface (DI-CNI) capable of instructing one or more of the plurality of entities to implement or emulate one or more physical layer related impairments:
        configuring, using a first DI-CNI message comprising first configuration information, a first container hosting a first application, wherein the first configuration information includes information for implementing or emulating a first physical layer related impairment for impairing traffic to or from the first container;
        configuring, using the first DI-CNI message or a second DI-CNI message comprising second configuration information, a second container hosting a second application, wherein the second configuration information includes information for implementing or emulating a second physical layer related impairment for impairing traffic to or from the second container;
        initiating a test session causing test packets to interact with the first container and/or the second container, wherein the test packets are impaired by the first physical layer related impairment and/or the second physical layer related impairment; and
        during the test session, sending a third DI-CNI message comprising third configuration information for modifying the first physical layer related impairment and/or the second physical layer related impairment.

2. The method of claim 1 wherein configuring the first container includes configuring an intra-node DI-CNI module implemented at a first physical or virtual computing node to impair egress packets sent to the second container or impair ingress packets received from the second container, wherein the first container and the second container are located at the first physical or virtual computing node.

3. The method of claim 2 wherein the cloud computing environment comprises a Kubernetes environment and the first physical or virtual computing node comprises a first Kubernetes node.

4. The method of claim 3 wherein the intra-node DI-CNI module comprises a Kubernetes CNI plug-in.

5. The method of claim 3 wherein the first container and the second container are located in different pods within the first Kubernetes node.

6. The method of claim 1 wherein configuring the first container includes configuring an inter-node DI-CNI module implemented at a first physical or virtual computing node to impair egress packets sent from the first container to the second container or impair ingress packets received by the first container from the second container, wherein the second container is located at a second physical or virtual computing node.

7. The method of claim 1 wherein the first application or the second application supports a border gateway protocol (BGP) routing protocol, an intermediate system to intermediate system (IS-IS) routing protocol, an exterior gateway protocol, an interior gateway protocol, segment routing, or a routing protocol.

8. The method of claim 1 wherein the first physical layer related impairment or the second physical layer related impairment includes causing a delay, jitter, packet drop, packet corruption, packet deduplication, a change in maximum transmission unit (MTU), a type of packet distribution, a uniform packet distribution, a normal packet distribution, a pareto packet distribution, a paretonormal packet distribution, packet reordering, a packet rate, or one or more link related impairments that change locations or extent multiple times.

9. The method of claim 1 wherein the first physical layer related impairment or the second physical layer related impairment is implemented or emulated using a daemon, a background process, a Linux mechanism, a Linux component, Linux traffic control, Linux netlink, or one or more Linux virtual ethernet (vEth) interfaces.

10. A system for emulating physical layer impairments in a cloud computing environment, the system comprising:
    at least one processor;
    a memory; and
    a test controller for configuring a plurality of entities in a cloud computing environment using a dynamic impairment container network interface (DI-CNI) capable of instructing one or more of the plurality of entities to implement or emulate one or more physical layer related impairments, wherein the test controller is implemented using the at least one processor and the memory, the test controller configured for:
        configuring, using a first DI-CNI message comprising first configuration information, a first container hosting a first application, wherein the first configuration information includes information for implementing or emulating a first physical layer related impairment for impairing traffic to or from the first container;
        configuring, using the first DI-CNI message or a second DI-CNI message comprising second configuration information, a second container hosting a second application, wherein the second configuration information includes information for implementing or emulating a second physical layer related impairment for impairing traffic to or from the second container;
        initiating a test session causing test packets to interact with the first container and/or the second container, wherein the test packets are impaired by the first physical layer related impairment and/or the second physical layer related impairment; and
        during the test session, sending a third DI-CNI message comprising third configuration information for modifying the first physical layer related impairment and/or the second physical layer related impairment.

11. The system of claim 10 wherein the test controller is configured for configuring an intra-node DI-CNI module implemented at a first physical or virtual computing node to impair egress packets sent to the second container or impair ingress packets received from the second container, wherein the first container and the second container are located at the first physical or virtual computing node.

12. The system of claim 11 wherein the cloud computing environment comprises a Kubernetes environment and the first physical or virtual computing node comprises a first Kubernetes node.

13. The system of claim 12 wherein the intra-node DI-CNI module comprises a Kubernetes CNI plug-in.

14. The system of claim 12 wherein the first container and the second container are located in different pods within the first Kubernetes node.

15. The system of claim 10 wherein the test controller is configured for configuring an inter-node DI-CNI module implemented at a first physical or virtual computing node to impair egress packets sent from the first container to the second container or impair ingress packets received by the first container from the second container, wherein the second container is located at a second physical or virtual computing node.

16. The system of claim 15 wherein the first physical or virtual computing node includes a first Kubernetes node, the second physical or virtual computing node includes a second Kubernetes node, and the first Kubernetes node and the second Kubernetes node are members of a Kubernetes cluster.

17. The system of claim 10 wherein the first application or the second application supports a border gateway protocol (BGP) routing protocol, an intermediate system to intermediate system (IS-IS) routing protocol, an exterior gateway protocol, an interior gateway protocol, segment routing, or a routing protocol.

18. The system of claim 10 wherein the first physical layer related impairment or the second physical layer related impairment includes causing a delay, jitter, packet drop, packet corruption, packet deduplication, a change in maximum transmission unit (MTU), a type of packet distribution, a uniform packet distribution, a normal packet distribution, a pareto packet distribution, a paretonormal packet distribution, packet reordering, a packet rate, or one or more link related impairments that change locations or extent multiple times.

19. The system of claim 10 wherein the first physical layer related impairment or the second physical layer related impairment is implemented or emulated using a daemon, a background process, a Linux mechanism, a Linux component, Linux traffic control, Linux netlink, or one or more Linux virtual ethernet (vEth) interfaces.

20. A non-transitory computer readable medium having stored thereon executable instructions that when executed by at least one processor of at least one computer cause the at least one computer to perform steps comprising:
  at a test controller for configuring a plurality of entities in a cloud computing environment using a dynamic impairment container network interface (DI-CNI) capable of instructing one or more of the plurality of entities to implement or emulate one or more physical layer related impairments:
    configuring, using a first DI-CNI message comprising first configuration information, a first container hosting a first application, wherein the first configuration information includes information for implementing or emulating a first physical layer related impairment for impairing traffic to or from the first container;
    configuring, using the first DI-CNI message or a second DI-CNI message comprising second configuration information, a second container hosting a second application, wherein the second configuration information includes information for implementing or emulating a second physical layer related impairment for impairing traffic to or from the second container;
    initiating a test session causing test packets to interact with the first container and/or the second container, wherein the test packets are impaired by the first physical layer related impairment and/or the second physical layer related impairment; and
    during the test session, sending a third DI-CNI message comprising third configuration information for modifying the first physical layer related impairment and/or the second physical layer related impairment.

\* \* \* \* \*